US008859667B2

(12) United States Patent
Grabowski et al.

(10) Patent No.: US 8,859,667 B2
(45) **Date of Patent: *Oct. 14, 2014**

(54) CARBON NANOTUBE FILLED POLYCARBONATE ANTI-CURL BACK COATING WITH IMPROVED ELECTRICAL AND MECHANICAL PROPERTIES

(75) Inventors: Edward F. Grabowski, Webster, NY (US); Kock-Yee Law, Penfield, NY (US); Markus R. Silvestri, Fairport, NY (US); Donald J. Goodman, Pittsford, NY (US); Dale S. Renfer, Webster, NY (US); Ryan J. Ehmann, Penfield, NY (US); Kathleen M. Carmichael, Williamson, NY (US); Scott J. Griffin, Fairport, NY (US); Jonathan H. Herko, Walworth, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1003 days.

This patent is subject to a terminal disclaimer.

(21) Appl. No.: 12/256,201

(22) Filed: Oct. 22, 2008

(65) Prior Publication Data

US 2009/0162637 A1 Jun. 25, 2009

Related U.S. Application Data

(63) Continuation-in-part of application No. 11/961,600, filed on Dec. 20, 2007.

(51) Int. Cl.
*B60C 1/00* (2006.01)
*G03G 7/00* (2006.01)

(52) U.S. Cl.
CPC .................................... *G03G 7/0086* (2013.01)
USPC .......................................................... 524/495

(58) Field of Classification Search
USPC ......... 524/496, 495, 497, 498, 537; 430/59.1, 430/58.05, 58.7, 126; 523/333; 525/416; 252/511; 428/412; 399/297
See application file for complete search history.

(56) References Cited

U.S. PATENT DOCUMENTS

| | | | | |
|---|---|---|---|---|
| 4,209,584 | A * | 6/1980 | Joseph | 430/527 |
| 5,382,486 | A * | 1/1995 | Yu et al. | 430/56 |
| 5,422,211 | A | 6/1995 | Law et al. | 430/59 |
| 5,935,748 | A * | 8/1999 | Yu et al. | 430/69 |
| 7,241,496 | B2 | 7/2007 | Chen et al. | 428/367 |
| 7,296,576 | B2 | 11/2007 | Ait-Haddou et al. | 128/397 |
| 2002/0048632 | A1* | 4/2002 | Smalley et al. | 427/230 |
| 2004/0034177 | A1* | 2/2004 | Chen | 525/416 |
| 2007/0060716 | A1* | 3/2007 | Ambravaneswaran et al. | 525/464 |
| 2007/0141493 | A1* | 6/2007 | Evans et al. | 430/69 |

OTHER PUBLICATIONS

Georgakilas, Vasilios, Konstantinos Kordatos, Maurizio Prato, Dirk K. Guildi, Michael Holzinger, and Andreas Hirsch. Organic Functionalization of Carbon Nanotubes. (Jan. 8, 2002) Journal of the American Chemical Society, 125(5), pp. 760-761).*

(Continued)

*Primary Examiner* — Ling Choi
*Assistant Examiner* — Thuy-Ai Nguyen
(74) *Attorney, Agent, or Firm* — Pillsbury Winthrop Shaw Pittman LLP

(57) ABSTRACT

Transparent or semi-transparent, electrically conductive anti-curl back coating composite for electrophotographic imaging member comprising a carbon nanotube complex and a polycarbonate binder are described along with processes for preparing them.

13 Claims, 7 Drawing Sheets

(56) References Cited

OTHER PUBLICATIONS

Chen, Jian, et al., Noncovalent Engineering of Carbon Nanotube Surfaces by Rigid, Functional Conjugated Polymers, J. Am. Chem. Soc., 2002, 124, 9034-9035.

Law, Kock-Yee, Organic Photoconductive Materials: Recent Trends and Developments, Chem. Rev., 1993, 93, 449-456.

Rutkofsky, Marni, et al. Using Carbon Nanotube Additive to Make Electrically Conductive Commercial Polymer Composites, Zyvex Application Note 9709, http://www.zyvex.com, (2006).

Rutkofsky, Marni, et al., Zyvex's NanoSolve® Technology: An Applications Overview, Zyvex Application Note 9714, http://www.zyvex.com, (2006).

* cited by examiner

CARBON NANOTUBE FILLED POLYCARBONATE ANTI-CURL BACK COATING WITH IMPROVED ELECTRICAL AND MECHANICAL PROPERTIES

RELATED APPLICATIONS

The application is a Continuation-In-Part of U.S. application Ser. No. 11/961,600, filed Dec. 20, 2007, which is expressly incorporated by reference.

FIELD OF THE INVENTION

The invention generally relates to use of carbon nanotubes in an electrophotographic imaging environment, and more specifically to electrically relaxable layers and coatings including soluble CNT complexes and polymers.

INTRODUCTION

Carbon nanotubes (CNTs), with their unique shapes and characteristics, are being considered for various applications. A carbon nanotube has a tubular shape of one-dimensional nature which can be grown through a nano metal particle catalyst. More specifically, carbon nanotubes can be synthesized by arc discharge or laser ablation of graphite. In addition, carbon nanotubes can be grown by a chemical vapor deposition (CVD) technique. With the CVD technique, there are also variations including plasma enhanced and so forth.

Carbon nanotubes can also be formed with a frame synthesis technique similar to that used to form fumed silica. In this technique, carbon atoms are first nucleated on the surface of the nano metal particles. Once supersaturation of carbon is reached, a tube of carbon will grow.

Regardless of the form of synthesis, and generally speaking, the diameter of the tube will be comparable to the size of the nanoparticle. Depending on the method of synthesis, reaction condition, the metal nanoparticles, temperature and many other parameters, the carbon nanotube can have just one wall, characterized as a single walled carbon nanotube, it can have two walls, characterized as a double walled carbon nanotube, or can be a multi-walled carbon nanotube. The purity, chirality, length, defect rate, etc. can vary. Very often, after the carbon nanotube synthesis, there can occur a mixture of tubes with a distribution of all of the above, some long, some short. Some of the carbon nanotubes will be metallic and some will be semiconducting. Single wall carbon nanotubes can be about 1 nm in diameter whereas multi-wall carbon nanotubes can measure several tens nm in diameter, and both are far thinner than their predecessors, which are called carbon fibers. It will be appreciated that differences between carbon nanotube and carbon nano fiber is decreasing with the rapid advances in the field. For purposes of the present invention, it will be appreciated that the carbon nanotube is hollow, consisting of a "wrapped" graphene sheet. In contrast, while the carbon nano fiber is small, and can even be made in dimension comparable to some large carbon nanotubes, it is a solid structure rather than hollow.

Carbon nanotubes in the present invention can include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its outer periphery covered with a carbon nanohorn or amorphous carbon.

Furthermore, carbon nanotubes in the present invention can include ones that contain some substances inside, such as: a metal-containing nanotube which is a carbon nanotube containing metal or the like; and a peapod nanotube which is a carbon nanotube containing a fullerene or a metal-containing fullerene.

As described above, in the present invention, it is possible to employ carbon nanotubes of any form, including common carbon nanotubes, variants of the common carbon nanotubes, and carbon nanotubes with various modifications, without a problem in terms of reactivity. Therefore, the concept of "carbon nanotube" in the present invention encompasses all of the above.

One of the characteristics of carbon nanotubes resides in that the aspect ratio of length to diameter is very large since the length of carbon nanotubes is on the order of micrometers, and can vary from about 200 nm to as long as 2 mm. Depending upon the chirality, carbon nanotubes can be metallic and semiconducting.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied research that exploits the excellent characteristics of carbon nanotubes has been extensive. To give a few examples, a carbon nanotube is added as a resin reinforcer or as a conductive composite material while another research uses a carbon nanotube as a probe of a scanning probe microscope. Carbon nanotubes have also been used as minute electron sources, field emission electronic devices, and flat displays.

As described above, carbon nanotubes can find use in various applications. In particular, the applications of the carbon nanotubes to electronic materials and electronic devices have been attracting attention. In an electrophotographic imaging process, an electric field can be created by applying a bias voltage to the electrophotographic imaging components, consisting of resistive coating or layers. Further, the coatings and material layers are subjected to a bias voltage such that an electric field can be created in the coatings and material layers when the bias voltage is ON and be sufficiently electrically relaxable when the bias voltage is OFF so that electrostatic charges are not accumulated after an electrophotographic imaging process. The fields created are used to manipulate unfused toner image along the toner path, for example from photoreceptor to an intermediate transfer belt and from the intermediate transfer belt to paper, before fusing to form the fixed images. These electrically resistive coatings and material layers are typically required to exhibit resistivity in a range of about $10^7$ to about $10^{12}$ ohm-cm and should possess mechanical and/or surface properties suitable for a particular application or use on a particular component.

It has been difficult to consistently achieve this desired range of resistivity with known coating materials. Two approaches have been used in the past, including ionic filler and particle filler; however, neither approach can consistently meet complex design requirements without some trade off. For example, coatings with ionic filler have better dielectric strength (high breakdown voltage), but the conductivity is very sensitive to humidity and/or temperature. In contrast, the conductivity of particle filler systems are usually less sensitive to environmental changes, but the breakdown voltage tends to be low.

More recently, carbon nanotubes have been used in polyimide and other polymeric systems to produce composites with resistivity in a range suitable for electrophotographic imaging devices. Since carbon nanotube is conductive with very high aspect ratio, the desirable conductivity, about $10^7$ to about $10^{12}$ ohm-cm, can be achieved with very low filler loading. The advantage of that is that, carbon nanotube will not change the property of the polymer binder at this loading level. This will open up design space for the selection of polymer binder for a given application.

However, carbon nanotubes were believed insoluble in a solvent and applications were limited to those materials using carbon nanotube dispersion. In a typical preparation of a filled polymer coating, mixing and blending are used to prepare a dispersion and then a coating. Even when carbon nanotubes are blended with polymers, the dispersion can be unsuitable depending upon the process. In the intended resistivity range of about $10^7$ to about $10^{12}$, it is difficult to prepare reliable relaxable materials using the usual dispersion techniques, which dispersions are also suitable for electrophotographic imaging applications. The resistivity of conductor-filled composites, including carbon nanotube composites, is very sensitive to the details of the dispersion process. To date, the most reproducible layer fabrications are based on solution coating (e.g. PR charge transport layer (CTL) coatings). For at least these reasons, carbon nanotube composites have not been looked to for use in electrophotographic imaging applications.

Accordingly, alternatives are sought to enable the use of carbon nanotubes in electrophotographic imaging applications, particularly in the coatings and materials of certain components such as, for example, the photoreceptor anti curl back coating (ACBC). High precision belt photoreceptors consist of a polymeric substrate of oriented polyester (PET or PEN) coated with a thin conducting layer (ground plane), thin blocking and adhesive layers, a thin charge generation layer, and a relatively thick (12 to 35 micron) charge transport layer. Long life photoreceptor belts use a high molecular weight (60,000 to 70,000) polycarbonate as the transport layer binder. The thermal expansion coefficient of the charge transport layer is greater than that of the polymeric substrate and would cause the photoreceptor to curl with changes in temperature. This problem is eliminated by coating the back side of the photoreceptor with a compensating layer of polycarbonate that provides an equal and opposite force on the substrate to hold the photoreceptor flat for all temperatures. The anti curl back coating can be filled with silica or PTFE particles for mechanical reinforcement. Xerographic printers that support the photoreceptor with sliding contact backer bars, such as the iGEN3 digital printer, experience significant electrostatic charge buildup on the anti curl back coating. The additional normal force between this charge and the resulting image charge in the electrically conductive backer bars produces additional mechanical drag which can exceed the drive motor capacity. A conductive fiber brush and bias power supply are required to remove this static charge from the back of the photoreceptor in the iGEN3 digital printer. The charge transport layer is under tension when the photoreceptor is bent around a roller or backer bar and must be fabricated from a high molecular weight polycarbonate for good mechanical life. The anti curl back coating is in compression when bent and does not need to be fabricated from a high molecular weight polycarbonate. Suitable polycarbonates would have a molecular weight range from 20,000 to 80,000. A polycarbonate will match the thermal expansion coefficient of the transport layer but any other polymer or polymer composite that matches the thermal expansion coefficient can also be used as the anti curl back coating.

SUMMARY

The invention includes compositions and methods of making them. In one embodiment, compositions of the invention are transparent or semi-transparent, electrically conductive anti-curl back coating composites comprising a carbon nanotube complex and a polycarbonate binder. Anti-curl back coating (ACBC) composites of the invention are intended for use in electrophotographic imaging members.

In one embodiment, an ACBC composite comprises a single-walled carbon nanotube or a multi-walled carbon nanotube, or a mixture thereof In another embodiment, an ACBC composite has an amount of carbon nanotube relative to the amount of polycarbonate binder that is between about 0.01 to about 10 weight percent.

In one embodiment, ACBC composites comprise a polycarbonate having a molecular weight range of 40,000 to 80,000 amu. Other ACBC composites comprise a polycarbonate having a molecular weight range of 60,000 to 70,000 amu.

ACBC composites according to other embodiments comprise a mixture of a first and a second polycarbonate. ACBC composites having two polycarbonates comprise a first polycarbonate having an average molecular weight of about 60,000 to about 70,000 amu and a second polycarbonate having an average molecular weight of less than about 40,000 amu.

One aspect of ACBC composites of the invention is a measured resistivity of $10^4$ to about $10^{10}$ ohm/sq. Another aspect of ACBC composites is a measured optical transparency of greater than 30 percent transmission.

Another embodiment of the invention are processes for preparing transparent or semi-transparent, electrically conductive ACBC composites. According to one embodiment, the steps of the process include:

(a) preparing a soluble carbon nanotube complex by mixing/dispersing a carbon nanotube with a poly(aryleneethynylene) polymer in a solvent; (b) mixing the soluble carbon nanotube complex with a high molecular weight polycarbonate in a solvent to form a coating dispersion; and (c) coating the dispersion onto an appropriate substrate such as the back side of a photoreceptor or a transparent Mylar substrate.

According to another embodiment, a process for preparing ACBC composites further comprises applying the coating composite to a substrate of an electrophotographic imaging component.

In another embodiment, a process for preparing ACBC composite uses single-walled carbon or a multi-walled carbon nanotubes, or a mixture thereof, and the total amount of carbon nanotube relative to the amount of polycarbonate is between about 0.01 to about 10 weight percent.

Processes for preparing ACBC composites according to another embodiment of the invention use polycarbonates having a molecular weight range of 40,000 to 80,000. Still other process embodiments use polycarbonates having a molecular weight range of 60,000 to 70,000 amu.

Other processes for preparing ACBC composites according to the invention use a mixture of a first and a second polycarbonate. Process embodiments use composites having two polycarbonates comprising a first polycarbonate having an average molecular weight of about 60,000 to about 70,000 amu, and a second polycarbonate having an average molecular weight of less than about 40,000 amu.

Another embodiment of the invention is an electrophotographic imaging member comprising an anti-curl back coating composite which comprises a carbon nanotube complex and a polycarbonate binder, wherein the carbon nanotube is a single-walled carbon nanotube or a multi-walled carbon nanotube, or a mixture thereof, the polycarbonate has a molecular weight range of 40,000 to 80,000 amu, and the amount of carbon nanotube relative to the amount of polycarbonate binder is between about 0.01 to about 10 weight percent.

It is to be understood that both the foregoing general description and the following detailed description are exemplary and explanatory only and are not restrictive of the invention, as claimed. The accompanying drawings, which are incorporated in and constitute a part of this specification, illustrate embodiments of the invention and together with the description, serve to explain the principles of the invention.

DETAILED DESCRIPTION

Figure 1A:
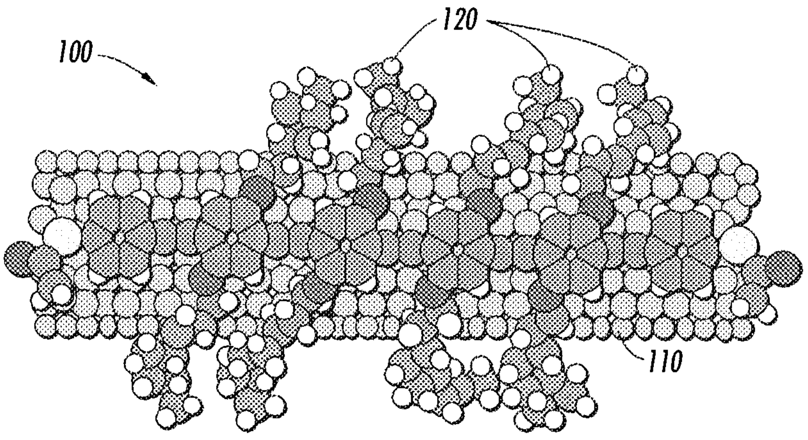
FIGS. 1A and 1B show A) a side perspective view; and B) is an end perspective view of FIG. 1A depicting a molecular model of a carbon nanotube complex in accordance with embodiments of the present teachings.

Reference will now be made in detail to the exemplary embodiments of the invention, examples of which are illustrated in the accompanying drawings. However, one of ordinary skill in the art would readily recognize that the same principles are equally applicable to, and can be implemented in devices other than coatings and layers for electrophotographic imaging type devices, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The detailed description is, therefore, not to be taken in a limiting sense and the scope of the present invention is defined by the appended claims and their equivalents. Wherever possible, the same reference numbers will be used throughout the drawings to refer to the same or like parts.

Carbon nanotubes exhibit extraordinary electrical, mechanical and thermal conductivity properties. Thermal conductivity, for example, is higher than that of copper. Carbon nanotubes can be synthesized by a number of methods including carbon arc discharge, pulsed laser vaporization, chemical vapor deposition (CVD) and high-pressure carbon monoxide vaporization. Of these, carbon nanotube synthesis by CVD can provide bulk production of high purity and easily dispersible product. Other material variants of carbon nanotubes can be used for electrophotographic imaging devices such as those disclosed herein.

In simplest terms, a carbon nanotube, on a microscopic scale, appears like a hexagonally shaped poultry wire mesh formed of hexagonal carbon rings. Carbon nanotube is conductive because of its unique electronic structure.

Dispersions of nanotubes in polycarbonates of the invention provide a matrix of long and thin conductive fibers in contact with each other. ACBC composites formulated from the carbon nanotube dispersions are electrically conductive (relaxable) and semi-transparent, e.g., having 30% or greater optical transmission. A conductive ACBC minimizes or eliminates the active power supply now used to discharge at the back of the belt, for example, in iGEN3 digital printing systems. An iGEN3 photoreceptor system is described in U.S. Pat. No. 7,344,809, U.S. Pat. No. 7,033,714, and U.S. Pat. No. 7,005,222.

When fabricating an anti-curl back coating, a nanotube loading in a dispersion is sought which has a level of electrical conductivity adequate to reduce or dissipate charge without filling too much space so as to absorb all light. Partial transparency is important for photoreceptor applications because image erase illumination is applied from inside the belt module and must go through the ACBC composite into the photoreceptor generator layer. The electrical conductivity allows triboelectrically generated charge to move through the layer and discharge before a significant level of charge builds up.

The addition of single or multi-wall carbon nanotubes imparts improved mechanical properties to the ACBC composite. The polymer fibers provide mechanical reinforcement which reduces wear and minimizes dust buildup. Belt surface friction issues are addressed with PTFE or silica fillers, and these same fillers can be added to provide independent control of the friction between the photoreceptor and the backer bars of the printer.

Carbon nanotubes normally exist as ropes and large bundles after synthesis. Dispersing or exfoliating them into individual tubes improves electrical and mechanical properties. This invention discloses soluble single and multi-wall carbon nanotube dispersions that have thermal expansion and low wear characteristics (provided by the high molecular weight polycarbonate) to produce an ACBC composite appropriate for an iGEN3/iGen4 digital color press or other printer. The composites of the present invention are appropriate for any belt photoreceptor that requires thermal stability for flatness and has sliding contact support elements that generate electrostatic charge.

Dispersions comprising polycarbonate polymers provide high quality dispersions as measured, for example, by resistivity, optical transparency, and transmission electron microscopy (TEM). ACBC composites of the invention have resistivities ranging from about $10^4$ to about $10^{10}$ Ohm/sq. ACBC composites of the invention have optical transparency of about 30% to 100%.

TEM is a tool to study the uniformity of the filler materials. In the present case, it will be the distribution of the carbon nanotubes. TEM images also show whether the carbon nanotube material is distributing uniformly in the binder.

One embodiment of the invention is directed to preparing a dispersion that includes a soluble carbon nanotube. This will enhance dispersion and coating quality. Generally speaking, there are two approaches to modify carbon nanotube to solubilize it or make it more compatible to polymer or solvent. One approach is to covalently form a chemical bond to the carbon nanotube. This approach essentially creates defects on the tube and very often destroys desired properties. Another approach is to use surfactants such as sodium dodecyl sulfate and polymers. Yet another approach is to solubilize carbon nanotube by wrapping a polymer chain onto the carbon nanotube. Examples of these polymer chains can be found in Zyvex products, or DNA as used by DuPont. In the case of solubilization achieved by wrapping a polymer chain onto the carbon nanotube, the solubilization enhances solubility in solvent and dispersity in polymer. Although such an approach may perturb the electronic property of the carbon nanotube, it represents a good compromise.

In exemplary embodiments herein, solubilization is achieved without functionalizing the carbon nanotube with a functional group as previously done in the art. In other words, no chemical bond is formed. This can be referred to as complexation between the carbon nanotube and the polymer. Once a chemical bond is formed, the electronic properties of the carbon nanotube can be changed. Thus, in the current example, the carbon nanotube material is solubilized and the electronic property remains the same.

Figure 1B:
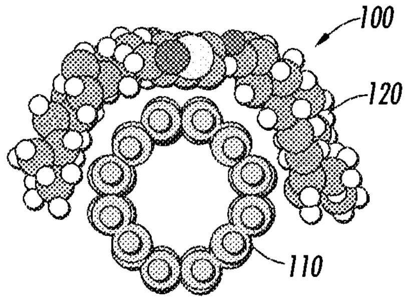

Referring to FIGS. 1A and 1B, a soluble carbon nanotube 100 is depicted in each of a side perspective and end perspective views. The soluble carbon nanotube (CNT) 100 is obtained as described in Chen et al. (J. Am. Chem. Soc., 124, 9034-9035 (2002)) by reacting carbon nanotube (CNT) 110 with a poly(aryleneethylnylene) 120 in chloroform to obtain a complex formed via $\pi$-$\pi$ interaction. A resulting carbon nanotube concentration equivalent to 2.2 mg/mL is obtained.

This invention provides a soluble CNT-polymer composite of an optimal resistivity for use in electrophotographic imaging components. The above composite is achieved through the following. In accordance with the present teachings, an electrically relaxable coating composite for electrophotographic imaging components is provided. The exemplary composite can include a soluble carbon nanotube complex and a polymer material combined with the soluble carbon nanotube complex.

In accordance with the present teachings, a process for forming an electrically relaxable coating composite is provided. The exemplary process can include providing a soluble carbon nanotube complex and mixing a polymer material with the soluble carbon nanotube complex. The exemplary process can further include applying the coating composite to a substrate of an electrophotographic imaging component.

One embodiment of a coating composite is a polycarbonate Anti-Curl-Back-Coating (ACBC) composite that incorporates dispersible carbon nanotubes. Anti Curl Back Coating (ACBC) composites that incorporate dispersible carbon nanotubes are suitable for use in iGEN3/iGen4 digital color press and other printers. An iGEN3 photoreceptor system is described in U.S. Pat. No. 7,344,809, U.S. Pat. No. 7,033,714, and U.S. Pat. No. 7,005,222.

Coating composites of the invention include an Anti-Curl Back Coating (ACBC) that dissipates electrical charge on the back surface of a multi-layer belt that are required to lie flat and which interact with sliding contact support elements inside the machine.

Embodiments pertain generally to solutions for obtaining electrically resistive coatings or layers in components of electrophotographic imaging devices. More specifically, the solutions can be applicable to obtaining soluble CNT/polymer coatings of a predetermined resistivity range. Soluble CNT can result in more uniform distribution of CNT in a polymer or other bulk material, thereby improving processing latitude.

To improve the quality of the CNT/polymer dispersion as well as the process latitude of the fabrication and coating steps, the present invention provides a composite including a soluble form of CNT and disperses these soluble CNTs in polymers for applications in electrophotographic imaging devices. Exemplary imaging device components suitable for coating by the novel composite includes the photoreceptor anti curl back coating. High precision belt photoreceptors consist of a polymeric substrate of oriented polyester (PET or PEN) coated with a thin conducting layer (ground plane), thin blocking and adhesive layers, a thin charge generation layer, and a relatively thick (12 to 35 micron) charge transport layer.

Long life photoreceptor belts use a high molecular weight (60,000 to 70,000) polycarbonate as the transport layer binder. The thermal expansion coefficient of the charge transport layer is greater than that of the polymeric substrate and would cause the photoreceptor to curl with changes in temperature. This problem is eliminated by coating the back side of the photoreceptor with a compensating layer of polycarbonate that provides an equal and opposite force on the substrate to hold the photoreceptor flat for all temperatures. The anti curl back coating can be filled with silica or PTFE particles for mechanical reinforcement. Xerographic printers that support the photoreceptor with sliding contact backer bars, such as the iGEN3 digital printer, experience significant electrostatic charge buildup on the anti curl back coating. The additional normal force between this charge and the resulting image charge in the electrically conductive backer bars produces additional mechanical drag which can exceed the drive motor capacity. A conductive fiber brush and bias power supply are required to remove this static charge from the back of the photoreceptor in the iGEN3 digital printer. The charge transport layer is under tension when the photoreceptor is bent around a roller or backer bar and must be fabricated from a high molecular weight polycarbonate for good mechanical life. The anti curl back coat is in compression when bent and does not need to be fabricated from a high molecular weight polycarbonate. Suitable polycarbonates would have a molecular weight range from 20,000 to 80,000. A polycarbonate will match the thermal expansion coefficient of the transport layer but any other polymer or polymer composite that matches the thermal expansion coefficient can also be used as the anti curl back coating.

It is known that CNT can be solubilized by a complexation process as described above in connection with FIGS. 1A and 1B and the Chen et al. model. The soluble CNT complex is non-functionalized, and as depicted in FIGS. 1A and 1B is utilized in the following.

Figure 2:
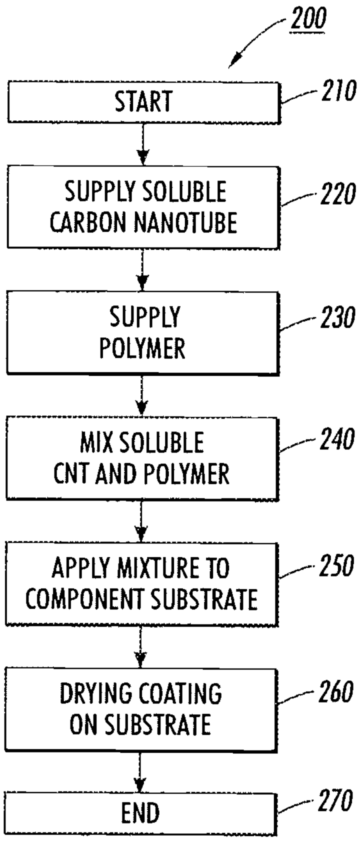
FIG. 2 is a process diagram in accordance with exemplary embodiments of the present teachings.

Referring to the process 200 of FIG. 2, and starting at 210, an amount of non-functionalized soluble carbon nanotube complex 100 is provided at 220 and an amount of polymer is supplied at 230. The non-functionalized soluble carbon nanotube complex is mixed, blended, or otherwise combined with the polymer at 240 to form a coating solution or dispersion or a usable composite. Typically, the coating material will be in a liquid or viscous form, suitable for application to a substrate. The coating material is applied to the substrate at 250, followed by curing, drying 260 or other suitable treatment for binding the coated layer to the selected substrate. The process ends at 270 and the thus coated component is ready for use in an electrophotographic imaging device.

The carbon nanotubes can be any of single wall carbon nanotube, double wall carbon nanotube, multiwall carbon nanotube, or a mixture thereof Length, diameter, and chirality can vary according to processing methods, duration and temperature of the synthesis. Likewise, purity can vary according to processing parameters.

It will be further appreciated that the soluble CNT/polymer composite can be provided on the substrate in a pattern, or as a uniform coating according to an end application of the imaging device component.

Exemplary embodiments are particularly described below with reference to FIGS. 7 and 8. Although specific terms are used in the following description for clarity, these terms are intended to refer only to the particular structure of the various embodiments selected for illustration in the drawings and not to define or limit the scope of the disclosure. The same reference numerals are used to identify the same structure in different figures unless specified otherwise. The structures in FIGS. 7 and 8 are not drawn according to their relative proportions and the drawings should not be interpreted as limiting the disclosure in size or location.

Figure 7:
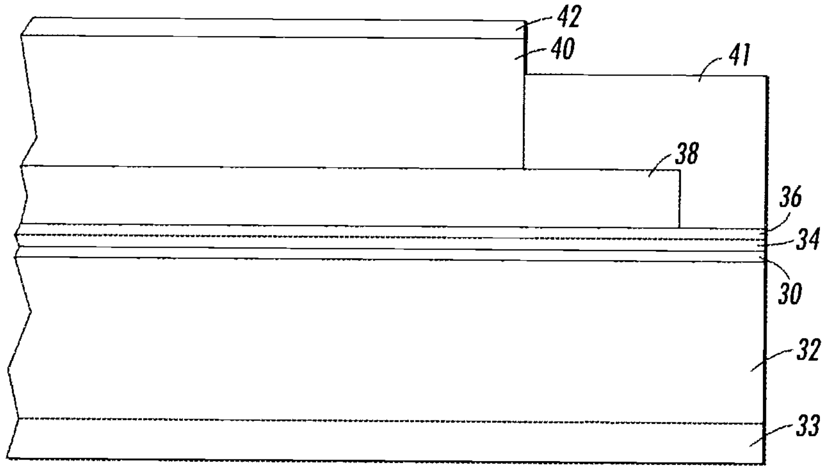
FIG. 7 shows the components of an electrophotographic imaging member according to the invention.

A typical negatively charged flexible electrophotographic imaging member is illustrated in FIG. 7. The substrate 32 has an optional conductive ground plane 30. An optional hole blocking layer 34 can also be applied, as well as an optional adhesive layer 36. The CGL 38 is located between the substrate 32 and the CTL 40 of present disclosure. An optional conductive ground strip layer 41 operatively provides an abrasive resistant connection to the conductive ground plane 30. An optional overcoat layer 42, if needed, may be added on to protect the CTL. To maintain imaging member flatness, an ACBC 33 of the present disclosure is applied to the side of the substrate 32 opposite to the electrically active layers.

The optional ground strip layer 41, applied to one edge of the imaging member provides a robust connection to the conductive ground plane 30 through the hole blocking layer 34. A conductive ground plane layer 30, which is typically a thin metallic layer, for example a 10 nanometer thick titanium coating, may be deposited over the substrate 32 by vacuum deposition or sputtering process. The layers 34, 36, 38, 40 and 42 may be separately and sequentially deposited, onto the surface of conductive ground plane 30 of substrate 32, as wet coating layer of solutions comprising a solvent, with each layer being dried before deposition of the next. The ACBC 33 is also solution coated, but is applied to the backside (the side opposite to all the other layers) of substrate 32, to render the imaging member flatness.

Figure 8:
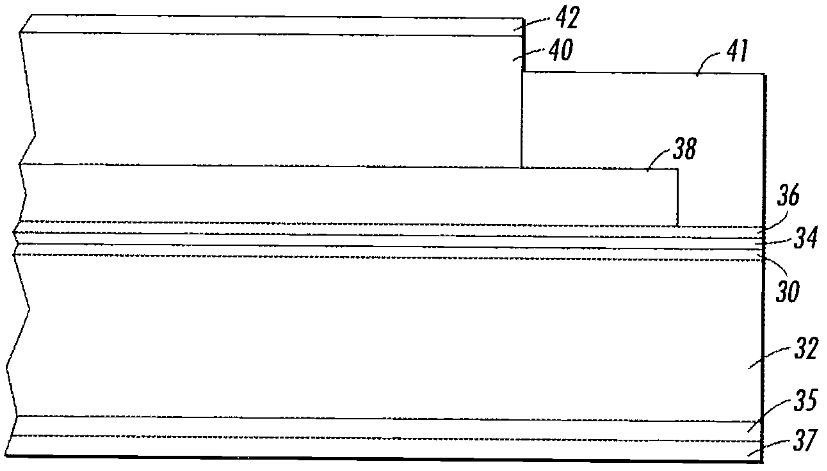
FIG. 8 shows the components of an electrophotographic imaging member further comprising an ACBC comprising an inner sublayer 35 and an outer sublayer 37.

An imaging member containing a dual ACBC of the present disclosure is illustrated in FIG. 8. The inner layer or sublayer 35 coated directly onto the substrate 32 is coated over by the outer layer or sublayer 37. The layers are defined in reference to the substrate 32; thus, the outer layer is the outermost layer and is the layer exposed to the machine environment.

Figure 9:
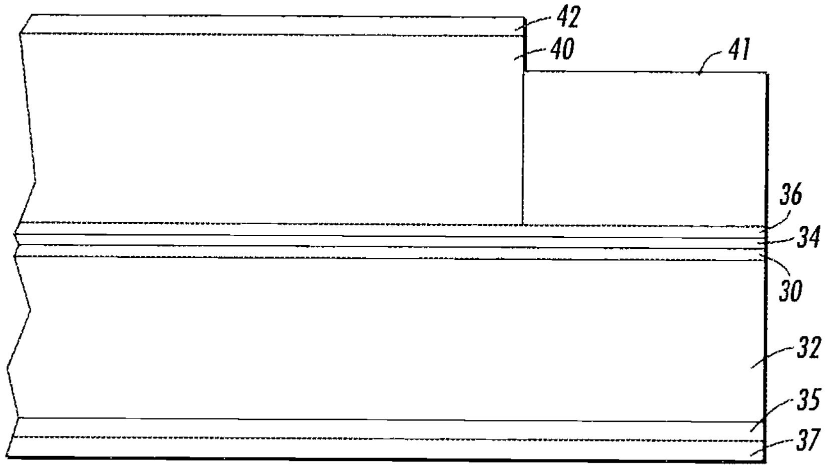
FIG. 9 shows the components of an alternative electrophotographic imaging member, having both charge generating and charge transporting capabilities.

As an alternative to the discrete CTL 40 and CGL 38 according to the illustrations in FIGS. 7 and 8, a simplified single imaging layer 22 of present disclosure, as shown in FIG. 9, having both charge generating and charge transporting capabilities, may be employed. The single imaging layer 22 may comprise a single electrophotographically active layer capable of retaining an electrostatic charge in the dark during electrostatic charging, image-wise exposure and image development, as disclosed, for example, in U.S. Pat. No. 6,756,169. The single layer incorporates both photogenerating material and charge transport component as described in reference to each separate layer below.

The Substrate

The photoreceptor support substrate 32 may be opaque or substantially transparent, and may comprise any suitable organic or inorganic material having the requisite mechanical properties. The substrate may comprise the same material as that in the electrically conductive surface, or the electrically conductive surface can be merely a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. It could be single metallic compound or dual layers of different metals and or oxides.

The substrate can also be formulated entirely of an electrically conductive material, or it can be an insulating material including inorganic or organic polymeric materials, such as, MYLAR, a commercially available biaxially oriented polyethylene terephthalate from DuPont, or polyethylene naphthalate available as KADALEX 2000, with a conductive layer comprising a conductive titanium or titanium/zirconium coating, otherwise a layer of an organic or inorganic material having a semiconductive surface layer, such as indium tin oxide, aluminum, titanium, and the like, or exclusively be made up of a conductive material such as, aluminum, chromium, nickel, brass, other metals and the like. The thickness of the support substrate depends on numerous factors, including mechanical performance and economic considerations. The substrate may have a number of many different configurations, such as, for example, a plate, a drum, a scroll, an endless flexible belt, and the like. In one embodiment, the substrate is in the form of a seamed flexible belt.

The thickness of the substrate depends on numerous factors, including flexibility, mechanical performance, and economic considerations. The thickness of the support substrate may range from about 50 micrometers to about 3,000 micrometers. In embodiments of flexible photoreceptor belt preparation, the thickness of substrate is from about 50 micrometers to about 200 micrometers for optimum flexibility and to effect minimum induced photoreceptor surface bending stress when a photoreceptor belt is cycled around small diameter rollers in a machine belt support module, for example, 19 millimeter diameter rollers.

An exemplary substrate support is not soluble in any of the solvents used in each coating layer solution, is optically transparent, and is thermally stable up to a high temperature of about 150° C. A typical substrate support used for imaging member fabrication has a thermal contraction coefficient ranging from about $1\times10^{-5}$/° C. to about $3\times10^{-5}$/° C. and a Young's Modulus of between about $5\times10^{-5}$ psi ($3.5\times10^{-4}$ kg/cm$^2$) and about $7\times10^{-5}$ psi ($4.9\times10^{-4}$ kg/cm$^2$).

The Conductive Layer

The conductive ground plane layer 30 may vary in thickness depending on the optical transparency and flexibility desired for the electrophotographic imaging member. When a photoreceptor flexible belt is desired, the thickness of the conductive layer on the support substrate typically ranges from about 2 nanometers to about 75 nanometers to enable adequate light transmission for proper back erase, and in embodiments from about 10 nanometers to about 20 nanometers for an optimum combination of electrical conductivity, flexibility, and light transmission. Generally, for rear erase exposure, a conductive layer light transparency of at least about 15 percent is desirable.

The conductive layer need not be limited to metals. The conductive layer may be an electrically conductive metal layer which may be formed, for example, on the substrate by any suitable coating technique, such as a vacuum depositing or sputtering technique. Typical metals suitable for use as conductive layer include aluminum, zirconium, niobium, tantalum, vanadium, hafnium, titanium, nickel, stainless steel, chromium, tungsten, molybdenum, combinations thereof, and the like. Where the entire substrate is an electrically conductive metal, the outer surface thereof can perform the function of an electrically conductive layer and a separate electrical conductive layer may be omitted. Other examples of conductive layers may be combinations of materials such as conductive indium tin oxide as a transparent layer for light having a wavelength between about 4000 Angstroms and about 9000 Angstroms or a conductive carbon black dispersed in a plastic binder as an opaque conductive layer.

The Hole Blocking Layer

A hole blocking layer 34 may then be applied to the substrate or to the conductive layer, where present. Any suitable positive charge (hole) blocking layer capable of forming an effective barrier to the injection of holes from the adjacent conductive layer 30 into the photoconductive or photogenerating layer may be utilized. The charge (hole) blocking layer may include polymers, such as, polyvinylbutyral, epoxy resins, polyesters, polysiloxanes, polyamides, polyurethanes, HEMA, hydroxylpropyl cellulose, polyphosphazine, and the like, or may comprise nitrogen containing siloxanes or silanes, or nitrogen containing titanium or zirconium compounds, such as, titanate and zirconate. The hole blocking layer may have a thickness in wide range of from about 5 nanometers to about 10 micrometers depending on the type of material chosen for use in a photoreceptor design. Typical hole blocking layer materials include, for example, trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl di(dodecylbenzene sulfonyl)titanate, isopropyl di(4-aminobenzoyl)isostearoyl titanate, isopropyl tri(N-ethylaminoethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, (gamma-aminobutyl)methyl diethoxysilane which has the formula $[H_2N(CH_2)_4]CH_3Si(OCH_3)_2$, and (gamma-aminopropyl)methyl diethoxysilane, which has the formula $[H_2N(CH_2)_3]CH_3Si(OCH_3)_2$, and combinations thereof, as disclosed, for example, in U.S. Pat. Nos. 4,338,387; 4,286,033; and 4,291,110. A hole blocking layer comprises a reaction product between a hydrolyzed silane or mixture of hydrolyzed silanes and the oxidized surface of a metal ground plane layer. The oxidized surface inherently forms on the outer surface of most metal ground plane layers when exposed to air after deposition. This combination enhances electrical stability at low RH. Other suitable charge blocking layer polymer compositions are also described in U.S. Pat. No. 5,244,762. These include vinyl hydroxyl ester and vinyl hydroxy amide polymers wherein the hydroxyl groups have been partially modified to benzoate and acetate esters which modified polymers are then blended with other unmodified vinyl hydroxy ester and amide unmodified polymers. An example of such a blend is a 30 mole percent benzoate ester of poly (2-hydroxyethyl methacrylate) blended with the parent polymer poly (2-hydroxyethyl methacrylate). Still other suitable charge blocking layer polymer compositions are described in U.S. Pat. No. 4,988,597. These include polymers containing an alkyl acrylamidoglycolate alkyl ether repeat unit. An example of such an alkyl acrylamidoglycolate alkyl ether containing polymer is a copolymer of poly(methyl acrylamidoglycolate methyl ether and 2-hydroxyethyl methacrylate).

The hole blocking layer can be continuous or substantially continuous and may have a thickness of less than about 10 micrometers because greater thicknesses may lead to undesirably high residual voltage. In aspects of the exemplary embodiment, a blocking layer of from about 0.005 micrometers to about 2 micrometers gives optimum electrical performance. The blocking layer may be applied by any suitable conventional technique, such as, spraying, dip coating, draw bar coating, gravure coating, silk screening, air knife coating, reverse roll coating, vacuum deposition, chemical treatment, and the like. For convenience in obtaining thin layers, the blocking layer may be applied in the form of a dilute solution, with the solvent being removed after deposition of the coating by conventional techniques, such as, by vacuum, heating, and the like. Generally, a weight ratio of blocking layer material and solvent of between about 0.05:100 to about 5:100 is satisfactory for spray coating.

The Adhesive Interface Layer

An optional separate adhesive interface layer 36 may be provided. The adhesive interface layer may include a copolyester resin. Exemplary polyester resins which may be utilized for the interface layer include polyarylatepolyvinylbutyrals, such as ARDEL POLYARYLATE (U-100) commercially available from Toyota Tsusho Inc., polyester based VITEL 1200B and VITEL 2200B from Bostik, 49,000 polyester from Rohm Haas, polyvinyl butyral, and the like. The adhesive interface layer may be applied directly to the hole blocking layer. Thus, the adhesive interface layer in some embodiments is in direct contiguous contact with both the underlying hole blocking layer and the overlying charge generating layer to enhance adhesion bonding to provide linkage. In yet other embodiments, the adhesive interface layer is entirely omitted.

Any suitable solvent or solvent mixtures may be employed to form a coating solution of the polyester for the adhesive interface layer. Typical solvents include tetrahydrofuran, toluene, monochlorbenzene, methylene chloride, cyclohexanone, and the like, and mixtures thereof Any other suitable and conventional technique may be used to mix and thereafter apply the adhesive layer coating mixture to the hole blocking layer. Typical application techniques include spraying, dip coating, roll coating, wire wound rod coating, and the like. Drying of the deposited wet coating may be effected by any suitable conventional process, such as oven drying, infra red radiation drying, air drying, and the like.

The adhesive interface layer may have a thickness of from about 0.01 micrometers to about 900 micrometers after drying. In embodiments, the dried thickness is from about 0.03 micrometers to about 1 micrometer.

The Charge Generating Layer

Any suitable charge generating layer (CGL) 38 including a photogenerating or photoconductive material, which may be in the form of particles and dispersed in a film forming binder, such as an inactive resin, may be utilized. Examples of photogenerating materials are described in Law et al. *Chem. Rev.* 1993, 93, 449-486. Suitable materials include, for example, inorganic photoconductive materials such as amorphous selenium, trigonal selenium, and selenium alloys selected from the group consisting of selenium-tellurium, selenium-tellurium-arsenic, selenium arsenide and mixtures thereof, and organic photoconductive materials including various phthalocyanine pigments such as the X-form of metal free phthalocyanine, metal phthalocyanines such as vanadyl phthalocyanine and copper phthalocyanine, hydroxy gallium phthalocyanines, chlorogallium phthalocyanines, titanyl phthalocyanines, quinacridones, dibromo anthanthrone pigments, benzimidazole perylene, substituted 2,4-diamino-triazines, polynuclear aromatic quinones, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example, in U.S. Pat. No. 4,587, 189. Multi-photogenerating layer compositions may be utilized where a photoconductive layer enhances or reduces the properties of the photogenerating layer. Other suitable photogenerating materials known in the art may also be utilized, if desired. The photogenerating materials selected should be sensitive to activating radiation having a wavelength between about 400 and about 900 nm during the imagewise radiation exposure step in an electrophotographic imaging process to form an electrostatic latent image. For example, hydroxygallium phthalocyanine absorbs light of a wavelength of from about 370 to about 950 nanometers, as disclosed, for example, in U.S. Pat. No. 5,756,245.

Any suitable inactive resin materials may be employed as a binder in the photogenerating layer, including those described, for example, in U.S. Pat. No. 3,121,006. Typical organic resinous binders include thermoplastic and thermosetting resins such as one or more of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride/vinylchloride copolymers, vinylacetate/vinylidene chloride copolymers, styrene-alkyd resins, and the like.

An exemplary film forming polymer binder is PCZ-400 (poly(4,4'-dihydroxy-diphenyl-1-1-cyclohexane) which has a MW of 40,000 and is available from Mitsubishi Gas Chemical Corporation.

The photogenerating material can be present in the resinous binder composition in various amounts. Generally, from about 5 percent by volume to about 90 percent by volume of the photogenerating material is dispersed in about 10 percent by volume to about 95 percent by volume of the resinous binder, and more specifically from about 20 percent by volume to about 30 percent by volume of the photo generating material is dispersed in about 70 percent by volume to about 80 percent by volume of the resinous binder composition.

The photogenerating layer containing the photogenerating material and the resinous binder material generally ranges in thickness of from about 0.1 micrometer to about 5 micrometers, for example, from about 0.3 micrometers to about 3 micrometers when dry. The photogenerating layer thickness is generally related to binder content. Higher binder content compositions generally employ thicker layers for photogeneration.

The Ground Strip Layer

Other layers such as conventional ground strip layer 41 comprising, for example, conductive particles dispersed in a film forming binder may be applied to one edge of the imaging member to promote electrical continuity with the conductive layer through the hole blocking layer. The ground strip layer 41 may include any suitable film forming polymer binder and electrically conductive particles and is co-extruded during the application of charge transport layer 40 coating. Typical ground strip materials include those enumerated in U.S. Pat. No. 4,664,995. The ground strip layer may have a thickness from about 7 micrometers to about 42 micrometers, for example, from about 14 micrometers to about 23 micrometers.

The Charge Transport Layer

The charge transport layer (CTL) 40 is thereafter applied over the CGL and may include any suitable transparent organic polymer or non-polymeric material capable of supporting the injection of photogenerated holes or electrons from the CGL and capable of allowing the transport of these holes/electrons through the CTL to selectively discharge the surface charge on the imaging member surface. In one embodiment, the CTL not only serves to transport holes, but also protects the CGL from abrasion or chemical attack and may therefore extend the service life of the imaging member. The CTL can be a substantially non-photoconductive material, but one which supports the injection of photogenerated holes from the charge generation layer. The CTL is normally transparent in a wavelength region in which the electrophotographic imaging member is to be used when exposure is effected therethrough to ensure that most of the incident radiation is utilized by the underlying CGL. The CTL should exhibit excellent optical transparency with negligible light absorption and neither charge generation nor discharge if any, when exposed to a wavelength of light useful in xerography, e.g., 400 to 900 nanometers. In the case when the photoreceptor is prepared with the use of a transparent substrate and also a transparent conductive layer, image wise exposure or erase may be accomplished through the substrate with all light passing through the back side of the substrate. In this case, the materials of the CTL need not transmit light in the wavelength region of use if the CGL is sandwiched between the substrate and the CTL. The CTL in conjunction with the CGL is an insulator to the extent that an electrostatic charge placed on the CTL is not conducted in the absence of illumination. The CTL should trap minimal charges as they pass through it during the printing process.

The CTL may include any suitable charge transport component or activating compound useful as an additive molecularly dispersed in an electrically inactive polymeric material to form a solid solution and thereby making this material electrically active. The charge transport component may be added to a film forming polymeric material which is otherwise incapable of supporting the injection of photo generated holes from the generation material and incapable of allowing the transport of these holes therethrough. This converts the electrically inactive polymeric material to a material capable of supporting the injection of photogenerated holes from the CGL and capable of allowing the transport of these holes through the CTL in order to discharge the surface charge on the CTL. The charge transport component typically comprises small molecules of an organic compound which cooperate to transport charge between molecules and ultimately to the surface of the CTL.

Any suitable inactive resin binder soluble in methylene chloride, chlorobenzene, or other suitable solvent may be employed in the CTL. Exemplary binders include polycarbonates, polyesters, polyvinyl butyrals, polystyrene, polyvinyl formals, and combinations thereof. The polymer binder used for the CTLs may be, for example, selected from the group consisting of bisphenol type polycarbonates, poly(vinyl carbazole), polystyrene, polyester, polyarylate, polyacrylate, polyether, polysulfone, combinations thereof, and the like. However, polycarbonates include poly(4,4'-isopropylidene diphenyl carbonate), poly(4,4'-diphenyl-1,1'-cyclohexane carbonate), and combinations thereof are the binder resin used for CTL preparation. The molecular weight of the polycarbonate binder can be for example, from about 20,000 to about 200,000. One exemplary of conventional film forming binder of this type is FPC-0170, a high molecular weight polycarbonate resin with a molecular weight between 60 k and 70 k (Mitsubishi Gas Chemical Co.)

The conventional bisphenol type polycarbonates that are typically utilized for the traditional CTL application have a molecular weight (Mw) of between about 20,000 and about 200,000, namely: (1) The bisphenol A polycarbonate of poly (4,4'-isopropylidene diphenyl) carbonate, as given in formula (A) below:

Formula (A)

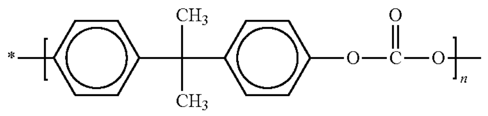

and an extended structure of the bisphenol A polycarbonate is given in below formula (B):

Formula (B)

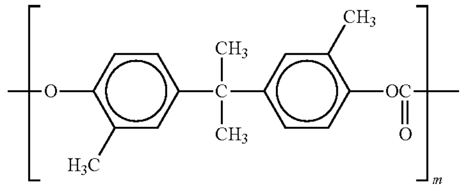

where n and m in formulas (A) and (B) indicate the respective degree of polymerization; (2) The bisphenol Z polycarbonate of poly(4,4'-diphenyl-1,1'-cyclohexane) carbonate, as given in formula (C) below:

Formula (C)

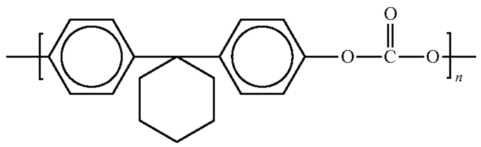

and an extended structure of bisphenol Z polycarbonate is given in formula (D) as follows:

Formula (D)

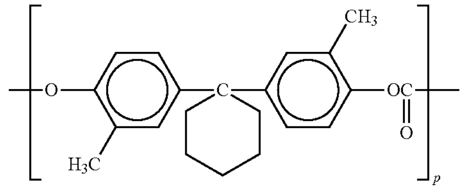

where n and p indicate each respective degree of polymerization; and (3) The phthalate-bisphenol A polycarbonate as represented by the structural formula (E) below:

Formula (E)

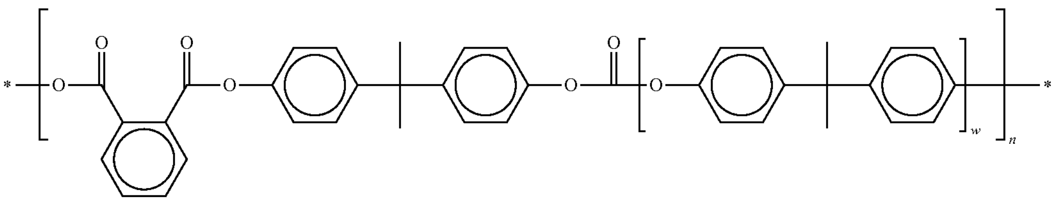

wherein w is an integer from about 1 to about 20, and n is the degree of polymerization.

Exemplary charge transport components include aromatic polyamines, such as aryl diamines and aryl triamines. Exemplary aromatic diamines include N,N'-diphenyl-N,N'-bis (alkylphenyl)-1,1'-biphenyl-4,4'-diamines, such as m-TBD, which has the formula (N,N'-diphenyl-N,N'-bis[3-methylphenyl]-[1,1'-biphenyl]-4,4'-diamine); N,N'-diphenyl-N,N'-bis(chlorophenyl)-1,1'-biphenyl-4,4'-diamine; and N,N'-bis-(4-methylphenyl)-N,N'-bis(4-ethylphenyl)-1,1'-(3,3'-dimethylbiphenyl)-4,4'-diamine (Ae-16), N,N'-bis(3,4-dimethylphenyl)-4,4'-biphenyl amine (Ae-18), and combinations thereof Other suitable charge transport components include pyrazolines, such as 1-[lepidyl-(2)]-3-(p-diethylaminophenyl)-5-(p-diethylaminophenyl)pyrazoline, as described, for example, in U.S. Pat. Nos. 4,315,982, 4,278,746, 3,837,851, and 6,214,514, substituted fluorene charge transport molecules, such as 9-(4'-dimethylaminobenzylidene)fluorene, as described in U.S. Pat. Nos. 4,245,021 and 6,214,514, oxadiazole transport molecules, such as 2,5-bis(4-diethylaminophenyl)-1,3,4-oxidiazole, pyrazoline, imidazole, triazole, as described, for example in U.S. Pat. No. 3,895,944, hydrazones, such as p-diethylaminobenzaldehyde (diphenylhydrazone), as described, for example in U.S. Pat.

Nos. 4,150,987 4,256,821, 4,297,426, 4,338,388, 4,385,106, 4,387,147, 4,399,207, 4,399,208, 6,124,514, and tri-substituted methanes, such as alkyl-bis(N,N-dialkylaminoaryl) methanes, as described, for example, in U.S. Pat. No. 3,820, 989.

The concentration of the charge transport component in the CTL may be from about 5 weight % to about 60 weight % based on the weight of the dried CTL. The concentration or composition of the charge transport component may vary through the CTL, as disclosed, for example, in U.S. Pat. Nos. 6,933,089, and 7,018,756. In one exemplary embodiment, the CTL comprises from about 10 to about 60 weight % of N,N'-diphenyl-N,N'-bis(3-methylphenyl)-1,1'-biphenyl-4,4'-diamine. In a more specific embodiment, the CTL comprises from about 30 to about 50 weight % N,N'-diphenyl-N,N'-bis (3-methylphenyl-1,1'-biphenyl-4,4'-diamine.

More specifically, a CTL is a solid solution including a charge transport component, such as N,N'-diphenyl-N,N'-bis (3-methylphenyl)-1,1'-biphenyl-4,4'-diamine, molecularly dissolved in a polycarbonate binder, the binder being either a poly(4,4'-isopropylidene diphenyl carbonate) or a poly(4,4'-diphenyl-1,1'-cyclohexane carbonate). The CTL may have a Young's Modulus in the range of from about 2.0×1 psi (1.7×104 Kg/$cm^2$) to about $4.5\times10^5$ psi ($3.2\times10^4$ Kg/$cm^2$), a glass transition temperature (Tg) of between about 50° C. and about 110° C. and a thermal contraction coefficient of between about $6\times10^{-5}$/° C. and about $8\times10^{-5}$/° C.

The CTL is an insulator to the extent that the electrostatic charge placed on the CTL is not conducted in the absence of illumination at a rate sufficient to prevent formation and retention of an electrostatic latent image thereon. In general, the ratio of the thickness of the CTL to the CGL is maintained from about 2:1 to about 200:1 and in some instances as great as about 400:1. The thickness of the CTL is from about 5 micrometers to about 100 micrometers, or more particularly from between about 15 micrometers and about 40 micrometers.

As an alternative to the use of two discretely separated layers of CTL 40 and CGL 38, a structurally simplified electrophotographic imaging member, as shown in FIG. 9, may be created by combining these two layers (with other layers remain unchanged) into a single imaging layer 22 having both charge transporting and charge generating capabilities which thereby eliminates the need of the two separate layers. The imaging layer 22 may comprise a single electrophotographically active layer capable of retaining an electrostatic charge in the dark during electrostatic charging, imagewise exposure and image development, as disclosed, for example, in U.S. Pat. No. 6,756,169. The single imaging layer 22 may include charge transport molecules in a binder consisting of a single film forming polymer and optionally, it may further include a photogenerating/photoconductive material, similar to those of the layer 38 described above. Additionally, the disclosure also relates to the inclusion in the CTL of variable amounts of an antioxidant, such as a hindered phenol. Exemplary hindered phenols include octadecyl-3,5-di-tert-butyl-4-hydroxyhydrocinnamate, available as IRGANOX I-1010 from Ciba Specialty Chemicals. The hindered phenol may be present at up to about 10 weight percent based on the total weight of the dried CTL. Other suitable antioxidants are described, for example, in U.S. Pat. No. 7,018,756.

The Overcoat Layer

Since the outermost exposed top CTL 40 of traditional design is highly susceptible to physical/mechanical failures during function, a robust overcoat layer 42 may optionally be utilized and coated directly over the CTL to provide protection and resolve the CTL associated shortcoming and issues.

The Anti-Curl Back Coating

Typical ACBC layer 33 is optically transparent—it transmits at least about 30 percent of incident light energy through the layer. The conventional ACBC is typically comprised of a film forming bisphenol type polycarbonate, generally the same one as that used in the CTL 40, and about 1 to 10 weight percent of a co-polyester adhesion promoter, based on the total weight of the ACBC, to give good adhesion bonding with the substrate 32. The ACBC 33 may generally have a Young's Modulus in the range of from about $2.0\times10^5$ psi ($1.7\times10^4$ Kg/$cm^2$) to about $4.5\times10^5$ psi ($3.2\times10^4$ Kg/$cm^2$), a glass transition temperature (Tg) of at least 90° C., and/or a thermal contraction coefficient of from about $6\times10^{-5}$/° C. to about $8\times10^{-5}$/° C. to approximately match those properties of the CTL to provide adequate anti-curling result.

Typically, the film-forming polymer for the ACBC preparation is a bisphenol A polycarbonate, having a weight average molecular weight Mw of from about 20,000 to about 200,000 are suitable for use. Specifically, polycarbonates having a molecular weight (Mw) of from about 50,000 to about 120,000 are used for forming a coating solution having proper viscosity for easy ACBC application. Polycarbonate candidates suitable for use in the inner layer may include a bisphenol A polycarbonate of poly(4,4'-dipropylidene-diphenylene carbonate) with a Mw of from about 35,000 to about 40,000, available as LEXAN 145 from General Electric Company; poly(4,4'-isopropylidene-diphenylene carbonate) with a molecular weight of from about 40,000 to about 45,000, available as LEXAN 141 from the General Electric Company; and a polycarbonate resin having a molecular weight of from about 20,000 to about 50,000 available as MERLON from Mobay Chemical Company.

The ACBC layer 33 may also contain a co-polyester adhesion promoter to render adhesion bonding to substrate 32. The adhesion promoter may comprise from about 1 to about 10 and from about 2 to about 10 weight percent of layer, based on the total weight of the ACBC layer 33. The adhesion promoter may be any known in the art, such as for example, polyester based VITEL 1200B and VITEL 2200B available from Bostik, Inc. (Middleton, Mass.).

A typical ACBC coating or layer 33 is of from about 5 to about 80 micrometers, and from about 10 to about 20 micrometers, in thickness is found to be adequately sufficient for balancing the curl and rendering the imaging member flat. The coating can be applied using any conventional technique, e.g. dip, spin, spray, draw-down, flow-coat, extrusion, etc. CNT is well known to be able to produce the resistivity range of interest (about $10^4$ to about $10^{12}$ ohm-cm) at very low loading and, without being limited to theory, the resulting CNT: poly(aryleneethylnylene) complex will perform similarly in polymers.

The soluble CNT complex can be combined with a polymer, either as a mixture in predetermined proportions or by other suitable methods. In one example of a coating material, multiwall carbon nanotube is mixed with a polycarbonate. At 2.5 percent loading, a surface resistivity of about $10^{10}$ Ohm per square was obtained.

Exemplary loading for multiwall carbon nanotube can be in the range of about 0.1 to about 5 percent depending upon polymer binder, solvent, thickness and other coating variations. For example, an amount of soluble CNT complex is mixed to obtain a unified coating material of a consistency or amount suitable for application to a substrate.

The substrate can be a belt, roll, or other substrate requiring a resistivity in the range defined by the coating.

Belt imaging components can include an ACBC to produce a device that will remain substantially flat over a range of machine operating temperature variations. Belt imaging components that incorporate large numbers of sliding positioning supports (for example, iGEN3) generate a large amount of electric charge from the sliding contact which must be discharged by an expensive combination of carbon fiber brush and a bias power supply. Failure to reduce, minimize or discharge the ACBC produces a large electrostatic attractive force between the imaging belt component and the support element. Increased electrostatic forces of the belt surface produce more drag which complicates photoreceptor belt removal and can become large enough to stall the drive motor during operation. In addition, the multiple points of sliding contact generate a significant quantity of fine polymer dust which coats the machine components and acts as a lubricant, reducing drive roller capacity. Normal drive capacity is restored by cleaning the rollers and backer bars, for example, each time a photoreceptor belt is changed with specialized solvents.

Drying or curing of the coated layer can be, for example, less than about 150° C. A coating thickness can be in the range of about 3 to about 50 microns. Further, a coating thickness can be in the range of about 5 to about 25 microns.

Exemplary polymers for combination with the soluble CNT complex can include nylons and other acrylic resins. Use of a low surface energy polymer can reduce surface contamination, and therefore partially fluorinated polymeric materials can also be used. Other exemplary polymers can include polycarbonates, polyesters (PMMA), polyacryclates, polvinylchlorides, polystyrenes, polyurethanes, etc.

The electrically relaxable layers or coatings prepared from soluble CNT complexes and polymers as applied to substrates and/or component surfaces, render the component surfaces electrically relaxable with resistivity in the range of about $10^4$ to about $10^{10}$ ohms per square.

The substrate 32 and the transport layer 40 will not, in general, have the same coefficient of thermal expansion due to differing requirements for the functional performance of the layers. Solution coating of the transport layer requires a drying step that heats the layers to temperatures in excess of 100° C. When the layers are cooled to room temperature, the shrinkage of the two layers differ and the resulting composite structure will not lay flat.

The Anti Curl Back Coat 33 (ACBC) is a layer that has a thermal expansion coefficient that is approximately the same as that of the transport layer and is coated at a thickness that produces a balancing force that is equal to that of the transport layer. The two matching forces of expansion from the transport layer and ACBC push equally on the substrate from both sides producing a layer that lays flat. The ACBC contacts all rollers and support elements in the xerographic printer.

Significant electrostatic charge can be generated due to friction and must be removed to produce robust mechanical operation. Static charges that transfer to steering or drive rollers will damage ball bearings that support the rollers. The image charge that develops in any conductive support element creates an attractive force that increases the frictional drag on the photoreceptor requiring additional motor torque to maintain belt motion.

The photoreceptor can have an additional requirement that parts of the generator layer 38 will require illumination through the ACBC side of the photoreceptor. Requirements include full belt erase exposure to eliminate any residual image and inter document or image edge exposure to minimize electrical stress in areas that are not used to generate images. The ACBC for photoreceptors requiring back surface illumination must transmit some of the light at the illuminating wavelength. The ACBC can be improved by making the layer conductive with fillers but the constraint imposed by optical transparency places severe limitations on the choice of fillers. The selection of carbon nanotubes as the filler enables electrical conductivity that will prevent the build up of friction generated charges while maintaining adequate optical transmission at the wavelengths required to discharge the photoreceptor. Additional fillers such as silica or PTFE particles can be included to improve wear resistance or to modify surface friction.

Although the relationships of components are described in general terms, it will be appreciated that one of skill in the art can add, remove, or modify certain components without departing from the scope of the exemplary embodiments.

It will be appreciated by those of skill in the art that several benefits are achieved by the exemplary embodiments described herein. For example, reduced costs, fewer components, reduction in drive motor torque requirements, ease of device installation due to the elimination of the electrostatic attraction between the photoreceptor and the metal backing elements in the xerographic printer.

Carbon nanotube coating dispersions can be obtained from Zyvex Performance Materials (Columbus, Ohio) Zyvex obtains carbon nanotube material, e.g., single-walled carbon nanotubes, multi-walled nanotubes, and carbonfibers from commercial sources, such as Arkema (Philadelphia, Pa.), Bayer Material Science of Germany, SouthWest Nano Technology in Norman, Okla.

Single- and multi-walled carbon nanotubes can be modified to make them soluble and compatible with solvents and polymers, without significant loss of desirable properties of the unmodified nanotubes. The modifications vary depending on the polymer and the solvent system.

Improved solvation of carbon nanotubes leads to improved dispersion of nanotubes in polymeric materials, for example, polycarbonates. Nanotube materials are combined with additives to non-covalently bridge nanotubes to polymeric materials, including polycarbonates. Without being bound by theory, non covalent π-stacking forces are the major intermolecular forces between additives and nanoparticles. Additional functional groups present on additive molecules facilitate solvation of nanotubes in a range of solvents and polymeric materials, for example, polycarbonates. Further methodology details are described in Chen et al. (*J. Am. Chem. Soc.* 2002, 124, 9034-9035).

A dispersion of multi-wall carbon nanotubes and methylene chloride was prepared having 5 weight percent nanotubes per unit weight polycarbonate. The weight percent nanotubes per unit weight polycarbonate can be varied by dilution. Additional samples were prepared by diluting the starting 5 percent nanotube dispersions with additional methylene chloride solvent and polycarbonate to produce three different nanotube weight percentage dispersions. The weight percentage of the MWNT and SWNT in polycarbonate polymer can vary depending on the viscosity of the dispersion and other processing parameter. The different weight percent dispersions are also referred to in terms of percent loading. Nanotube dispersions having 5.0, 3.75, and 2.5 weight percent nanotube dispersions were prepared.

Surface conductivity of ACBC composite samples was determined using a HiResta (DIA Instruments Co, LTD; Japan) conductivity meter. Conductivity readings for ACBC composite samples with the higher loadings were below the instrument threshold at voltages above 10 volts. Measurements of the same samples with a LoResta (DIA Instruments Co, LTD; Japan) resistivity meter, which measures in a different conductivity range but at a fixed low voltage replicate the 10 volt numbers. All samples should function as anti-stat coatings.

Optical transmission properties of ACBC composite samples were characterized with a Perkin Elmer Lambda 19 spectrophotometer. Typical erase wavelengths for photoreceptor devices are 660 and 770 nanometers, thus ACBC samples having 2.5 percent multi-walled carbon nanotube loading exhibit reasonable anti-stat conductivity and greater than 30 percent optical transmission.

While the invention has been illustrated with respect to one or more exemplary embodiments, alterations and/or modifications can be made to the illustrated examples without departing from the spirit and scope of the appended claims. In particular, for example, although certain method embodiments have been described by examples, the steps of the method may be performed in a different order than illustrated or simultaneously. In addition, while a particular feature of the invention may have been disclosed with respect to only one of several embodiments, such feature may be combined with one or more other features of the other embodiments as may be desired and advantageous for any given or particular function.

Unless otherwise defined, all technical and scientific terms used herein have the same meaning as commonly understood by one of ordinary skill in the art to which this invention belongs. In case of conflict, the specification, including definitions, will control.

All patent applications, publications, patents and other references, cited herein are incorporated by reference in their entirety.

As used herein, the singular forms "a", "and," and "the" include plural referents unless the context clearly indicates otherwise. Thus, for example, reference to "a nanotube" includes a plurality of nanotubes and reference to "an a polycarbonate" can include reference to one or more polycarbonates.

To the extent that the terms "including," "includes," "having," "has," "with," or variants thereof are used herein, such terms are intended to be inclusive in a manner similar to the term "comprising." And as used herein, the term "one or more of" with respect to a listing of items such as, for example, "one or more of A and B," means A alone, B alone, or A and B.

Notwithstanding that the numerical ranges and parameters setting forth the invention are approximations, the numerical values set forth in the specific examples are reported as precisely as possible. Any numerical value, however, inherently contains certain errors necessarily resulting from the standard deviation found in their respective testing measurements.

All ranges disclosed herein are to be understood to encompass any and all sub-ranges and individual integers subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5, or an integer therein, e.g., 1, 2, 3, 4, etc.

It is understood that other embodiments will be apparent and may be utilized by one of skill in the art, and that structural and operational changes may be made without departing from the scope of the present disclosure. It is intended that the specification and examples be considered as exemplary only, with a true scope and spirit of the invention being indicated by the accompanying claims and their equivalents.

EXAMPLES

Example 1

ACBC composites were prepared from dispersions having multi-walled carbon nanotubes solubilized in FPC-0170 available from Mitsubishi Gas Chemical Co. FPC-0170 is a polycarbonate polymer based on 98 percent bisphenol A and 2 percent bisphenol Z and has measured molecular weight range of 60,000 to 70,000 (measured by auto capillary viscometer). The high molecular weight also makes it compatible with the existing Xerox web coating capabilities.

Figure 3:
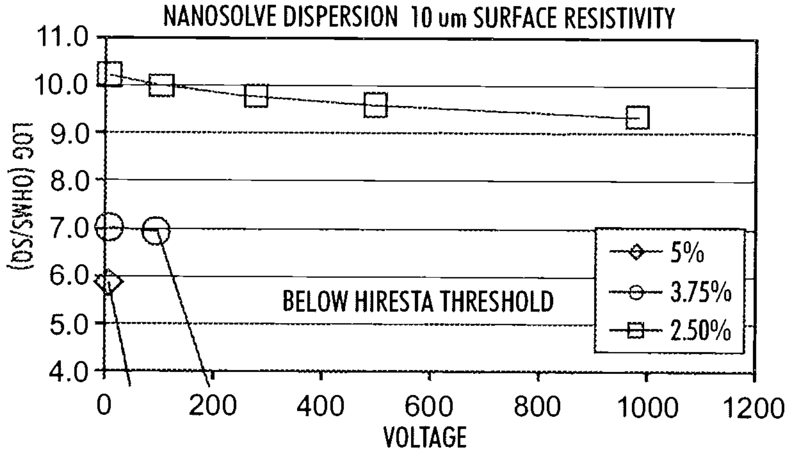
FIG. 3 shows the surface resistivity of the ACBC layer (not the entire device) as a function of the loading of the MWCNT in polycarbonate (2.5%, 3.75% and 5.0%).
Figure 4:
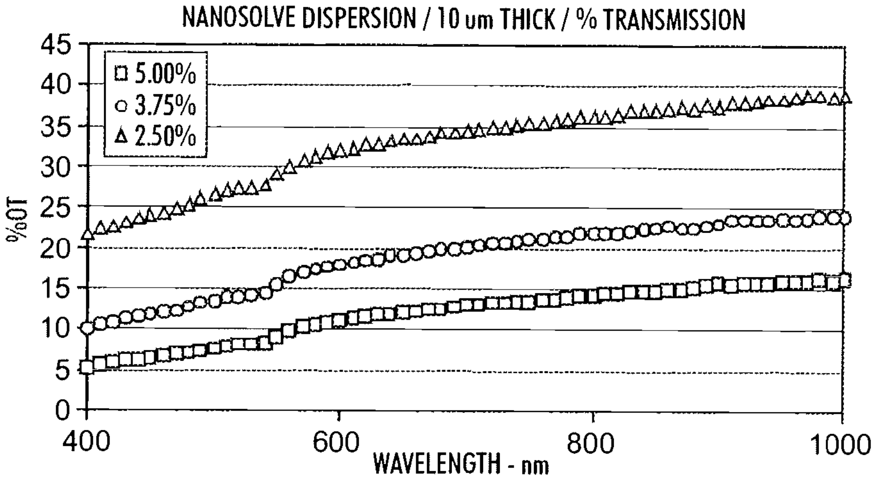
FIG. 4 shows percent optical transmission (OT) vs. wavelength as a function of the loading of the MWCNT in polycarbonate (2.5%, 3.75% and 5.0%).

Nanotubes were dispersed at a 5% by weight loading in FPC-0170/Methylene Chloride by Zyvex Performance Materials, Columbia, Ohio. The 5% dispersion was adjusted to 9% solids and coated onto a sheet of 3 mil thick 442C PET (DuPont) using a 4.5 mil gap draw down coating bar to create a 10 micrometer thick film. The film was dried at 120° C. for one minute. Additional ACBC composites were created by diluting the initial 5% dispersion with additional FPC-0170 to produce composites with carbon nanotube loadings of 3.75% and 2.5% by weight. The solids were adjusted to 9% by adding solvent and samples were coated onto a sheet of 3 mil thick 442C PET (DuPont) using a 4.5 mil gap draw down coating bar creating films that were 10 micrometers thick. The films were dried at 120° C. for one minute. The electrical resistivity of the films was determined using a HiResta surface conductivity meter (DIA Instruments Co, LTD; Japan). The results are presented in FIG. 3. The optical properties of the same films were determined with a Perkin Elmer Lambda 19 Spectrophotometer (Perkin Elmer) and are presented in FIG. 4. Note that the 2.5% loaded sample has a resistivity in the $10^{10}$ ohms per square range with an optical transparency that exceeds 30% for wavelengths longer that 600 nanometers.

Figure 5:
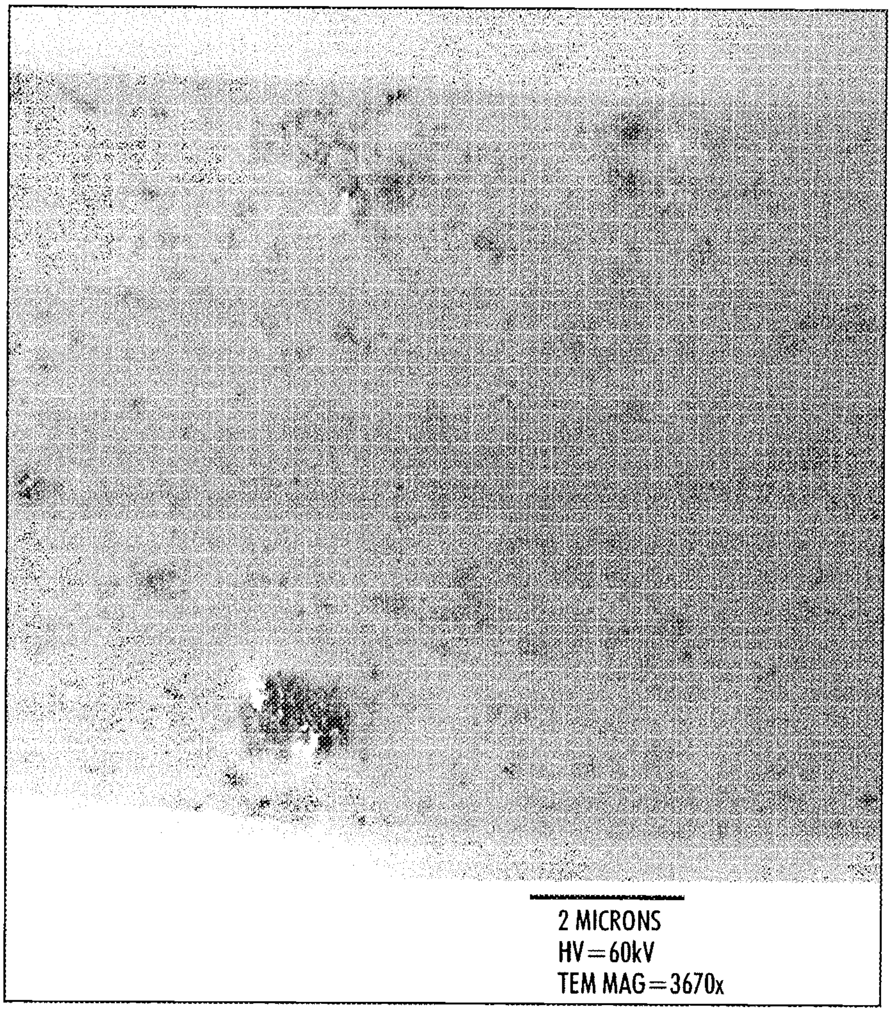
FIG. 5 shows a TEM image of an exemplary coating dispersion of the invention.

A TEM image of 3.75 percent loading of MWCN dispersed in FPC-0170 is shown in FIG. 5. The TEM picture just shows that the carbon nanotube material is distributing uniformly in the binder.

Example 2

Figure 6A:
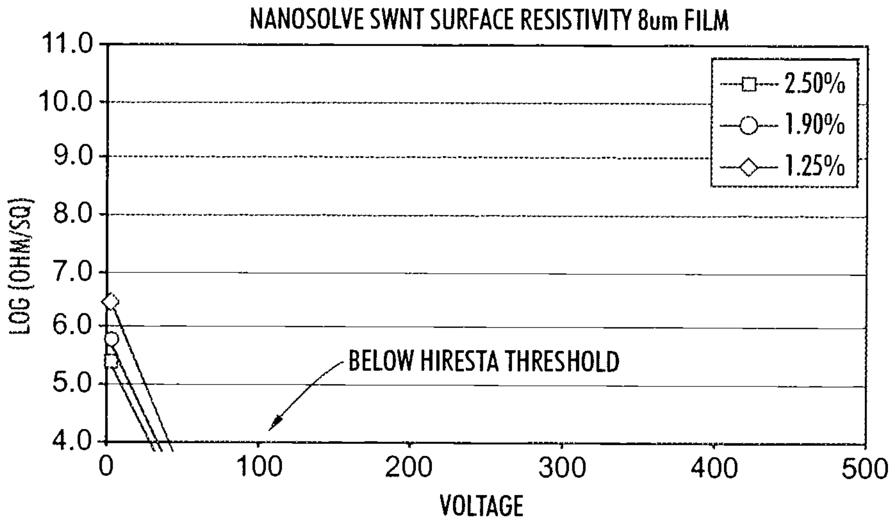
FIG. 6A-6B show A) surface resistivity for a SWCNT ACBC composite; and B) the percent optical transmission for a SWCNT ACBC composite.
Figure 6B:
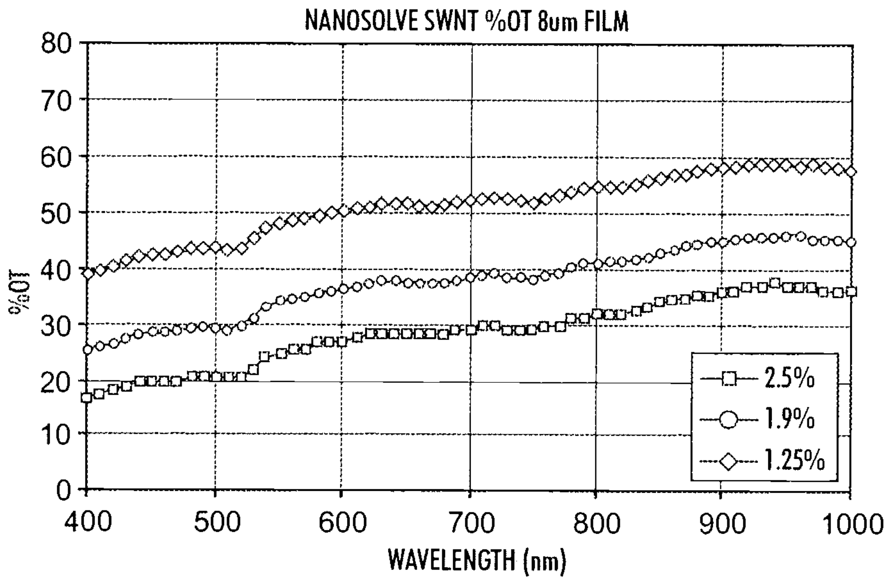

ACBC composites were prepared from dispersions having single-walled carbon nanotubes solubilized in FPC-0170, a high molecular weight polycarbonate resin with a molecular weight between 60 k and 70 k (Mitsubishi Gas Chemical Co.). The nanotubes were dispersed at a 2.5% by weight loading in FPC-0170/Methylene Chloride by Zyvex Performance Materials, Columbia, Ohio. The 2.5% dispersion was adjusted to 9% solids and coated onto a sheet of 3 mil thick 442C PET (DuPont) using a 4.5 mil gap draw down coating bar to create an 8 micrometer thick film. The film was dried at 120° C. for one minute. Additional ACBC composites were created by diluting the initial 2.5% dispersion with additional FPC-0170 to produce composites with carbon nanotube loadings of 1.9% and 1.25% by weight. The solids were adjusted to 9% by adding solvent and samples were coated onto a sheet of 3 mil thick 442C PET (DuPont) using a 4.5 mil gap draw down coating bar creating films that were 8 micrometers thick. The films were dried at 120° C. for one minute. The electrical resistivity of the films was determined using a HiResta surface conductivity meter (DIA Instruments Co, LTD; Japan). The results are presented in FIG. 6A. The optical properties of the same films were determined with a Perkin Elmer Lambda 19 Spectrophotometer (Perkin Elmer) and are presented in FIG. 6B. Note that the 1.25% and 1.9% loaded samples have a resistivity in the $10^6$ ohms per square range with an optical transparency that exceeds 30% for wavelengths longer that 600 nanometers. The Single Wall Nanotubes are able to produce the desired electrical resistivity (less than $10^4$ to $10^{10}$ ohms per square) at significantly higher optical transmission levels.

What is claimed is:

1. A transparent or semi-transparent, electrically conductive anti-curl back coating layer comprising an inner sublayer disposed on a substrate of an electrophotographic imaging member and an outer sublayer disposed on the inner sublayer, wherein the outer sublayer comprises an anti-curl back coating composite comprising a carbon nanotube complex and a polycarbonate binder, wherein the polycarbonate has a molecular weight range of 40,000 to 80,000 amu and the polycarbonate consisting of poly(4,4'-dipropylidene-diphenylene carbonate) and poly(4,4'-diphenyl-1,1'-cyclohexane carbonate), wherein the amount of carbon nanotube relative to the amount of polycarbonate binder is between about 0.01 to about 10 weight percent.

2. The transparent or semi-transparent, electrically conductive anti-curl back coating layer of claim 1, wherein the carbon nanotube complex comprises a carbon nanotube which is a single-walled carbon nanotube or a multi-walled carbon nanotube, or a mixture thereof.

3. The transparent or semi-transparent, electrically conductive anti-curl back coating layer of claim 1, wherein the polycarbonate has a molecular weight of 60,000 to 70,000 amu.

4. The transparent or semi-transparent, electrically conductive anti-curl back coating layer of claim 1, wherein the anti-curl back coating composite exhibits a resistivity of $10^4$ to about $10^{10}$ ohm/sq.

5. The transparent or semi-transparent, electrically conductive anti-curl back coating layer of claim 1, wherein the anti-curl back coating composite exhibits an optical transparency of greater than 30 percent transmission.

6. An electrophotographic imaging member comprising:

a substrate;

one or more imaging layers disposed on the substrate; and an anti-curl back coating layer disposed on a side of the substrate opposite to the one or more imaging layers, wherein the anti-curl back coating layer comprises an inner sublayer disposed on the substrate and an outer sublayer disposed on the inner sublayer, and wherein the outer sublayer comprises an anti-curl back coating composite comprising a carbon nanotube complex and a polycarbonate binder, and further wherein the carbon nanotube is a single-walled carbon nanotube or a multi-walled carbon nanotube, or a mixture thereof, the polycarbonate has a molecular weight range of 40,000 to 80,000 amu, wherein the polycarbonate consisting of poly(4,4'-dipropylidene-diphenylene carbonate) and poly(4,4'-diphenyl-1,1'-cyclohexane carbonate), wherein the amount of carbon nanotube relative to the amount of polycarbonate binder is between about 0.01 to about 10 weight percent.

7. The transparent or semi-transparent, electrically conductive anti-curl back coating layer of claim 1, wherein the anti-curl back coating composite is provided on the substrate in a pattern.

8. The transparent or semi-transparent, electrically conductive anti-curl back coating layer of claim 1 further comprises silica or PTFE particles.

9. The transparent or semi-transparent, electrically conductive anti-curl back coating layer of claim 1, wherein the carbon nanotube complex is formed by covalently forming a chemical bond to a carbon nanotube.

10. The transparent or semi-transparent, electrically conductive anti-curl back coating layer of claim 1, wherein the carbon nanotube complex is formed by wrapping a polymer chain onto a carbon nanotube.

11. The transparent or semi-transparent, electrically conductive anti-curl back coating layer of claim 1, wherein the carbon nanotube complex is formed by mixing a surfactant with a carbon nanotube.

12. A transparent or semi-transparent, electrically conductive anti-curl back coating layer comprising an inner sublayer disposed on a substrate of an electrophotographic imaging member and an outer sublayer disposed on the inner sublayer, wherein the outer sublayer comprises an anti-curl back coating composite comprising a carbon nanotube complex and a polycarbonate binder, wherein the polycarbonate has a molecular weight range of 60,000 to 70,000 amu and the polycarbonate consisting of poly(4,4'-dipropylidene-diphenylene carbonate) and poly(4,4'-diphenyl-1,1'-cyclohexane carbonate), wherein the amount of carbon nanotube relative to the amount of polycarbonate binder is between about 0.01 to about 10 weight percent, wherein the composite exhibits a resistivity of $10^4$ to about $10^{10}$ ohm/sq.

13. The transparent or semi-transparent, electrically conductive anti-curl back coating layer of claim 12, wherein the carbon nanotube complex comprises a carbon nanotube which is a single-walled carbon nanotube.

* * * * *